United States Patent
Jones, IV et al.

(10) Patent No.: US 8,532,038 B2
(45) Date of Patent: Sep. 10, 2013

(54) METHODS AND APPARATUS FOR FRAME EXCHANGE FOR SDMA UPLINK DATA

(75) Inventors: Vincent Knowles Jones, IV, Redwood City, CA (US); Maarten Menzo Wentink, Naarden (NL); Alok Aggarwal, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 914 days.

(21) Appl. No.: 12/535,515

(22) Filed: Aug. 4, 2009

(65) Prior Publication Data

US 2010/0046453 A1  Feb. 25, 2010

Related U.S. Application Data

(60) Provisional application No. 61/090,207, filed on Aug. 19, 2008.

(51) Int. Cl.
*H04W 72/04* (2009.01)

(52) U.S. Cl.
USPC .......................................... 370/329

(58) Field of Classification Search
USPC ............ 370/470, 338, 345, 335, 310–313, 370/328–329, 332, 439; 455/561, 450, 509; 375/228
See application file for complete search history.

(56) References Cited

U.S. PATENT DOCUMENTS

| 7,899,079 B2* | 3/2011 | Yang ............................. 370/470 |
| 8,149,749 B2* | 4/2012 | Maeda et al. ................. 370/311 |
| 2005/0138199 A1 | 6/2005 | Li et al. |
| 2006/0121946 A1* | 6/2006 | Walton et al. ................ 455/561 |
| 2007/0270154 A1 | 11/2007 | Kim et al. |
| 2008/0095223 A1* | 4/2008 | Tong et al. .................... 375/228 |
| 2008/0159122 A1 | 7/2008 | Dor |
| 2008/0310385 A1* | 12/2008 | Iochi et al. ................... 370/345 |
| 2009/0245187 A1* | 10/2009 | Nam et al. .................... 370/329 |
| 2009/0257389 A1* | 10/2009 | Mohanty et al. ............. 370/329 |
| 2010/0008331 A1* | 1/2010 | Li et al. ........................ 370/335 |
| 2011/0086644 A1* | 4/2011 | Dahlman et al. ............. 455/450 |
| 2011/0190018 A1* | 8/2011 | Love et al. .................... 455/509 |
| 2012/0099576 A1* | 4/2012 | Li et al. ........................ 370/338 |

FOREIGN PATENT DOCUMENTS

| CN | 1853374 A | 10/2006 |
| JP | 2006506892 A | 2/2006 |
| JP | 2007502077 A | 2/2007 |
| JP | 2007528176 A | 10/2007 |
| JP | 2010510712 A | 4/2010 |
| WO | WO2005015844 | 2/2005 |
| WO | 2005086422 A1 | 9/2005 |

OTHER PUBLICATIONS

Stefan Parkvall et al., "WCDMA Enhanced Uplink—Principles and Basic Operation," IEEE, 2005.

(Continued)

*Primary Examiner* — Kwang B Yao
*Assistant Examiner* — Syed M Bokhari
(74) *Attorney, Agent, or Firm* — Kevin T. Cheatham

(57) ABSTRACT

Certain embodiments provide a method for scheduling simultaneous transmissions of data from multiple wireless nodes in a wireless communications system.

67 Claims, 6 Drawing Sheets

(56) References Cited

OTHER PUBLICATIONS

International Search Report—PCT/US2009/054210—International Search Authority, European Patent Office, Jan. 22, 2010.

Sheng Zhou et al; "An Uplink Medium Access Protocol with SDMA Support for Multiple-Antenna WLANs" Wireless Communications and Networking Conference, 2008. WCNC 2008. IEEE, IEEE, Piscataway, NJ, USA, Mar. 31, 2008, pp. 1809-1814, XP031243907.

Taiwan Search Report—TW098127932—TIPO—Jan. 1, 2013.

Written Opinion—PCT/US2009/054210—ISA/EPO—Jan. 22, 2010.

* cited by examiner

METHODS AND APPARATUS FOR FRAME EXCHANGE FOR SDMA UPLINK DATA

CROSS-REFERENCE TO RELATED APPLICATION

This application claims benefit of U.S. Provisional Patent Application Ser. No. 61/090,207 filed Aug. 19, 2008, which is herein incorporated by reference in its entirety.

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems.

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial channels, where, for all practical purposes, $N_S \leq \min\{N_T, N_R\}$. The $N_S$ spatial channels may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S \leq \min\{N_T, \text{sum}(N_R)\}$, where $\text{sum}(N_R)$ represents the summation of all user terminal receive antennas. When SDMA is transmitted to an access point, $N_S \leq \min\{\text{sum}(N_T), N_R\}$, where $\text{sum}(N_T)$ represents the summation of all user terminal transmit antennas.

SUMMARY

Certain embodiments provide a method for scheduling simultaneous transmissions of data from multiple wireless nodes in a wireless communications system. The method generally includes transmitting a request for information regarding uplink transmissions from the wireless nodes, receiving, in response to the request, information regarding uplink transmissions from the wireless nodes, transmitting an allocation confirmation message allocating uplink resources to a set of at least some of the wireless nodes based on the received information, and receiving simultaneous transmissions of data from the set of wireless nodes.

Certain embodiments provide a method for scheduling transmissions of data from a wireless node in a wireless communications system that supports simultaneous transmissions of data from multiple wireless nodes. The method generally includes transmitting information regarding uplink transmissions via an orthogonal frequency division multiple access (OFDMA) transmission scheme utilizing a subset of available tones in the system, receiving a message acknowledging receipt of the transmitted information regarding uplink transmissions, and transmitting data on an uplink after receiving the allocation confirmation message.

Certain embodiments provide an apparatus for scheduling simultaneous transmissions of data from multiple wireless nodes in a wireless communications system. The apparatus generally includes logic for transmitting a request for information regarding uplink transmissions from the wireless nodes, logic for receiving, in response to the request, information regarding uplink transmissions from the wireless nodes, logic for transmitting an allocation confirmation message allocating uplink resources to a set of at least some of the wireless nodes based on the received information, and logic for receiving simultaneous transmissions of data from the set of wireless nodes.

Certain embodiments provide an apparatus for scheduling transmissions of data from a wireless node in a wireless communications system that supports simultaneous transmissions of data from multiple wireless nodes. The apparatus generally includes logic for transmitting information regarding uplink transmissions via an orthogonal frequency division multiple access (OFDMA) transmission scheme utilizing a subset of available tones in the system, logic for receiving a message acknowledging receipt of the transmitted information regarding uplink transmissions, and logic for transmitting data on an uplink after receiving the allocation confirmation message.

Certain embodiments provide an apparatus for scheduling simultaneous transmissions of data from multiple wireless nodes in a wireless communications system. The apparatus generally includes means for transmitting a request for information regarding uplink transmissions from the wireless nodes, means for receiving, in response to the request, information regarding uplink transmissions from the wireless nodes, means for transmitting an allocation confirmation message allocating uplink resources to a set of at least some of the wireless nodes based on the received information, and means for receiving simultaneous transmissions of data from the set of wireless nodes.

Certain embodiments provide an apparatus for scheduling transmissions of data from a wireless node in a wireless communications system that supports simultaneous transmissions of data from multiple wireless nodes. The apparatus generally includes means for transmitting information regarding uplink transmissions via an orthogonal frequency division multiple access (OFDMA) transmission scheme utilizing a subset of available tones in the system, means for receiving a message acknowledging receipt of the transmitted information regarding uplink transmissions, and means for transmitting data on an uplink after receiving the allocation confirmation message.

Certain embodiments provide a computer-program product for scheduling simultaneous transmissions of data from multiple wireless nodes in a wireless communications system comprising a computer readable medium having instructions stored thereon, the instructions being executable by one or more processors. The instructions generally include instructions for transmitting a request for information regarding uplink transmissions from the wireless nodes, receiving, in response to the request, information regarding uplink transmissions from the wireless nodes, transmitting an allocation confirmation message allocating uplink resources to a set of at least some of the wireless nodes based on the received information, and receiving simultaneous transmissions of data from the set of wireless nodes.

Certain embodiments provide a computer-program product for scheduling transmissions of data from a wireless node in a wireless communications system that supports simultaneous transmissions of data from multiple wireless nodes comprising a computer readable medium having instructions stored thereon, the instructions being executable by one or more processors. The instructions generally include instructions for transmitting information regarding uplink transmissions via an orthogonal frequency division multiple access (OFDMA) transmission scheme utilizing a subset of available tones in the system, receiving a message acknowledging receipt of the transmitted information regarding uplink transmissions, and transmitting data on an uplink after receiving the allocation confirmation message.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
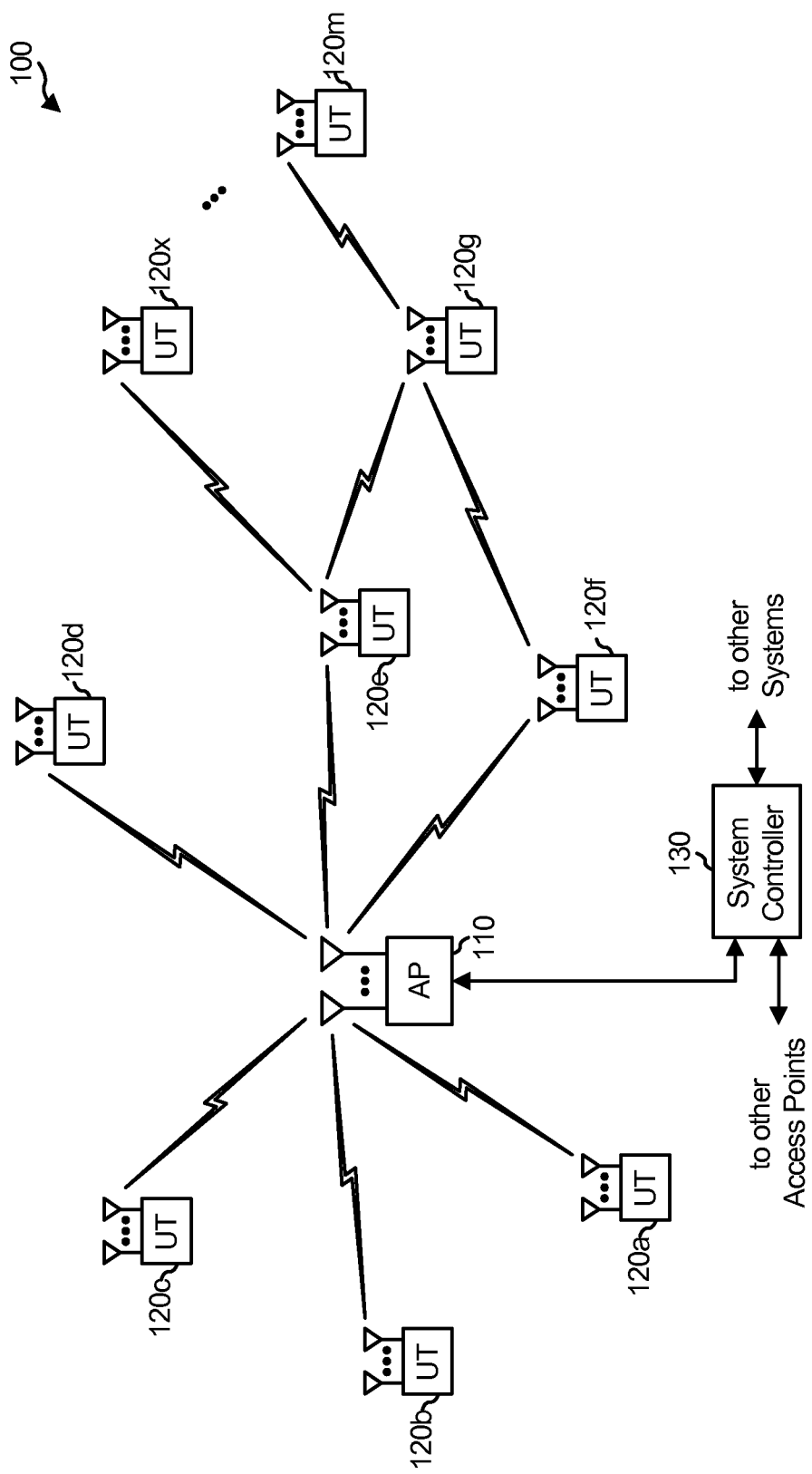
FIG. 1 shows a spatial division multiple access MIMO wireless system in accordance with certain embodiments of the present disclosure.

FIG. 1 shows a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via spatial division multiple access (SDMA), for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
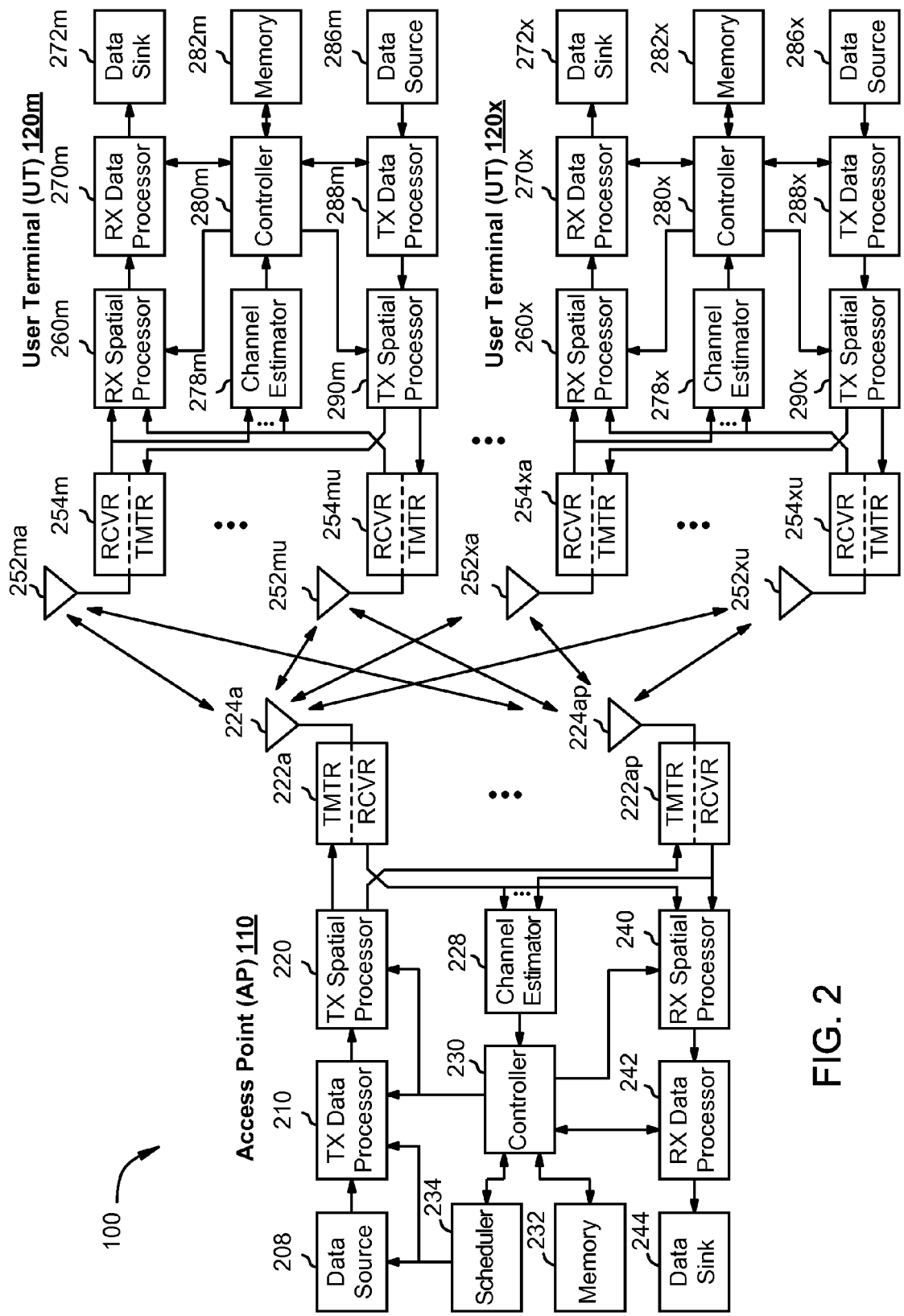
FIG. 2 shows a block diagram of an access point and two user terminals in accordance with certain embodiments of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
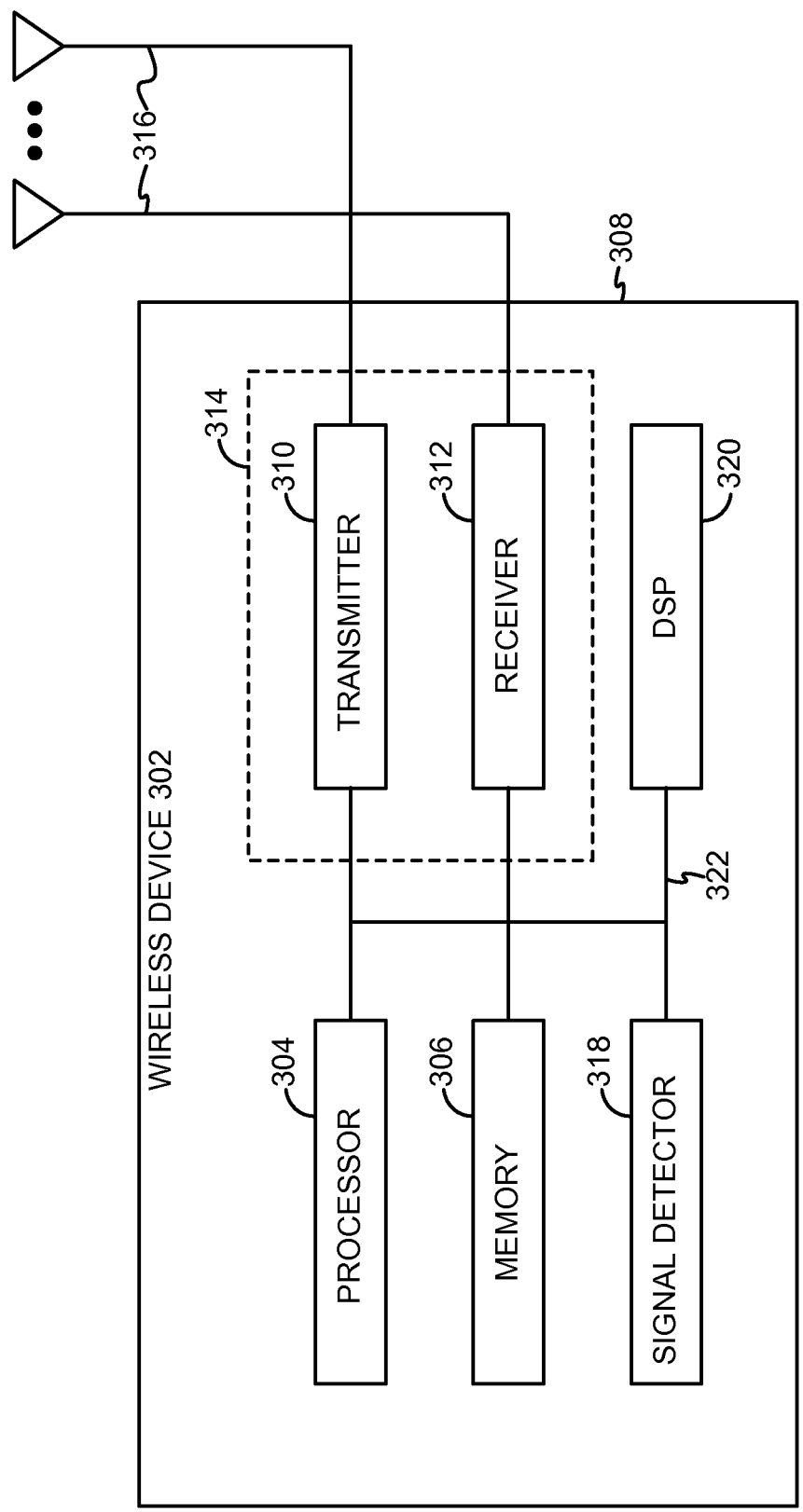
FIG. 3 illustrates example components of a wireless device in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314.

The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

Uplink SDMA Using OFDMA Allocation Indication

In a Spatial Division Multiple Access (SDMA) scheme, uplink (UL) transmissions from multiple stations (STAs) to an access point (AP) should be synchronized to allow the AP to properly decode the transmissions. UL transmissions should be synchronized in terms of arrival time at the AP, frequency, received power length of packets, and allocation of spatial streams.

While UL synchronization may be performed via a scheduler on the AP, or via use of a Point Coordination Function (PCF) or HCF Controlled Channel Access (HCCA), such mechanisms may be less than ideal for various reasons. For example, the use of a scheduler on the AP may be complex and, in addition, may preclude a STA to request a Transmit Opportunity (TXOP) when needed.

Techniques provided herein, however, utilize a Request to Send (RTS) non-contention based scheme using OFDM for allocation (TXOP) requests from SDMA stations. These techniques allow synchronization of UL transmissions to be primarily accomplished by the stations, thereby reducing the scheduling burden on the AP. In order to accomplish this, for certain embodiments, the stations may follow a set of synchronization rules when exchanging uplink data. As a result, certain techniques provided herein may provide a resource-efficient frame exchange that allows an AP to coordinate spatial resources and, in some cases, to determine the upstream Modulation and Coding Scheme (MCS) for each station.

Figure 4:
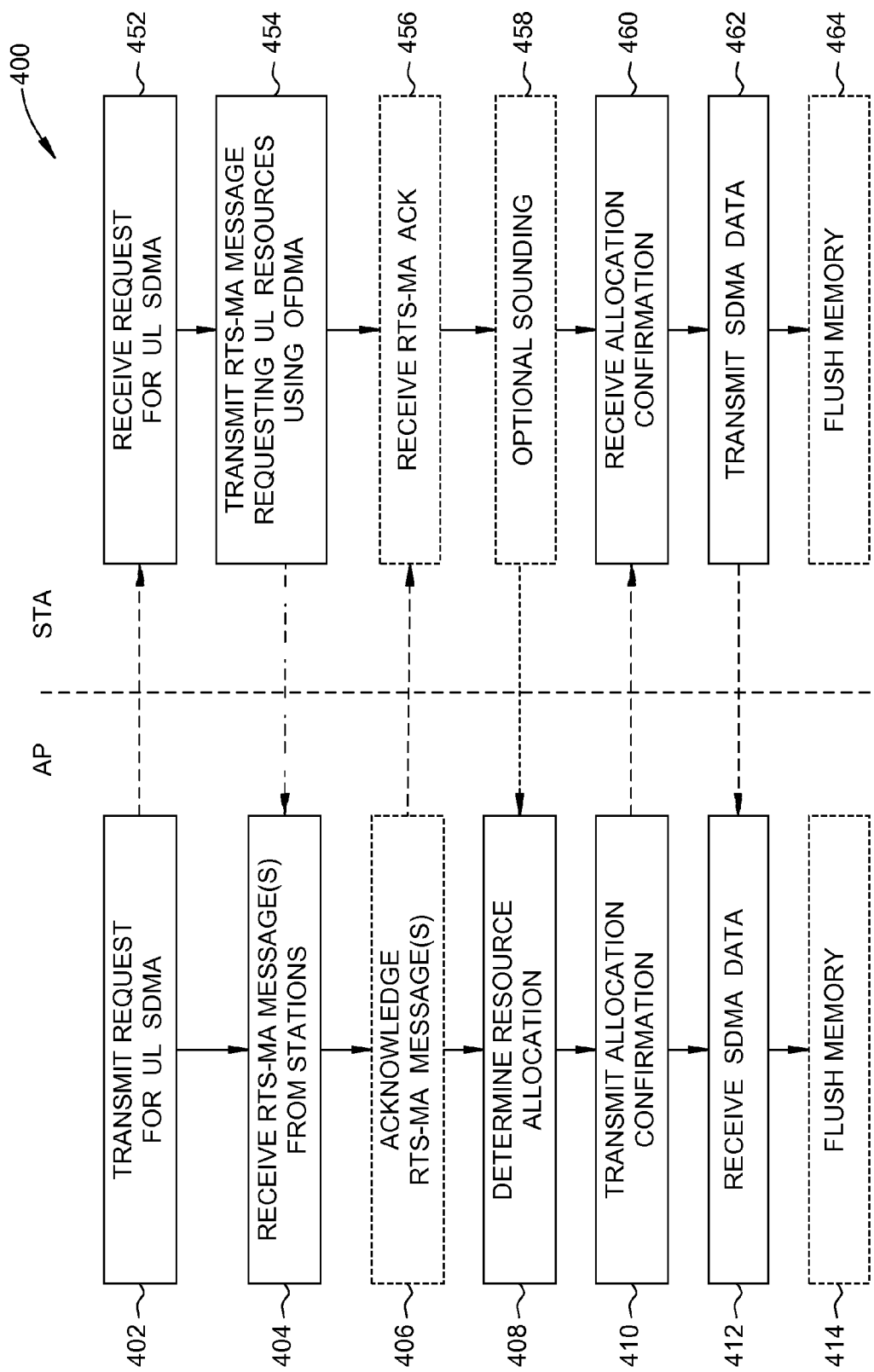
FIG. 4 illustrates example operations for synchronizing uplink transmissions of multiple access stations, according to one embodiment of the disclosure.

FIG. 4 illustrates example operations for exchanging frames for uplink SDMA transmissions, in accordance with certain embodiments of the present disclosure. The illustrated operations include operations performed at an access point and corresponding operations performed at a station. As will be described with reference to the timing diagram shown in FIG. 5, the station operations may be performed by multiple SDMA stations simultaneously.

The AP may initiate a frame exchange, at 402, by transmitting a request for UL SDMA information, in what may be referred to as a "Request for SDMA" or RSDMA. For certain embodiments, before initiating the frame exchange by sending the RSDMA, the AP may have to gain channel access, for example, via conventional EDCA techniques. However, within the UL SDMA frame sequence, there may be no contention for resources.

The RSDMA frame may be sent as a regular multi-cast MSDU. A conservative MCS may be used to ensure all stations can decode the frame. The signal characteristics of the RSDMA frame, such as bandwidth (e.g. 20 MHz, 40 MHz, 60 MHz or 80 MHz), guard interval length, and pilot tone number, may indicate implicitly to the stations what signal characteristics should be used for subsequent UL transmissions. The RSDMA may also indicate the number of frames allowed for the RTS-MA messages (allocation indication) described below. The RSDMA may also indicate an RTS-MA frame number start and frame number end (e.g., as 4-bit fields).

Each RTS-MA frame may accommodate a certain number of users (e.g., each frame may accommodate a number of users on the order of 4 multiplied by the number of streams per 20 MHz channel used). The RSDMA may also provide an indication of allocated tones and spatial streams to use for RTS-MAs. The RSDMA may also contain an output power indication (EIRP) used to help clients determine link budget. The RSDMA may also contain a mechanism, such as a postamble, to assist with time and frequency sync.

At 452, the stations receive the RSDMA. Timing (and optionally frequency synchronization) of SDMA UL transmissions may be synchronized based on arrival of the RSDMA. For certain embodiments, received power of the RSDMA may also be used for coarse power adjustments.

At 454, the station transmits a Request to Send multiple access (RTS-MA) message. The RTS-MA message generally indicates a request for an allocation of resources, for example, indicating a station sending the RTS-MA has UL data to send. The RTS-MA may contain a variety of UL transmission information, such as a transmission class (TC-such as voice, video, or Best Effort) and a transmission length. For example, 14 bits of the RTS-MA may allow a station to provide a 2-bit TC indication and a 12-bit data length.

For certain embodiments, the RTS-MA frame may be sent utilizing an OFDMA frame with a preamble and data. Each station may be allocated a subset of tones and a number of spatial streams to use for sending the RTS-MA. For certain embodiments, stations may be pre-assigned tones and spatial streams, for example, during initial association with the AP. The tone and stream allocation may be changed, however, with management action frames or multi-cast announcement frames. Each station may send its RTS-MA using a suitable MCS, for example, such as higher than QPSK, 1/2 rate coding. For certain embodiments, however, each station may have the full range of tones and/or spatial streams available.

For certain embodiments, to accommodate a high number of stations, multiple RTS-MA frames may be sent in series (separated by SIFS spacing). For example, assuming 4 stations per 20 MHz of bandwidth, a single RTS-MA frame using 80 MHz and 16 receive antennas at the AP may support 256 stations. On the other hand, again assuming 4 stations per 20 MHz of bandwidth, 16 RTS-MA frames would be needed, when using 20 MHz and 4 receive antennas at the AP.

At 404, the AP receives the RTS-MA message from stations and, optionally, at 406, sends an RTS-MA Acknowledgement (ACK) message. The RTS-MA ACK may be a multi-cast message sent by the AP using the lowest MCS used by a station to send an RTS-MA, in an effort to ensure receipt of the RTS-MA ACK by each station. The RTS-MA ACK may optionally define spatial stream allocation. For certain embodiments, the RTS-MA ACK may request sounding signals from the one or more stations and may define a length of the transmit opportunity (TXOP) for all stations to set their NAV.

For certain embodiments, the RTS-MA ACK sent by the AP may also contain synchronization feedback included as N-bits in the message. For example, the RTS-MA ACK may include 4 bits specifying a number of samples to retard or advance the start of transmissions, 4 bits carrying a power differential in units of 1 dB, and/or 8 bits carrying a frequency differential shift in units of 3.12 kHz. Such feedback information may allow the AP to make fine adjustments to transmission parameters of each station, based on the sounding signals received therefrom.

At 456, if sent, the station may receive the RTS-MA acknowledge message. As described above, the RTS-MA ACK may optionally request sounding signals from some stations. At 458, stations that were requested to do so send sounding signals. The sounding signals may be sent as a frame preamble only and the number of long training fields (LTFs) in the preamble may also be specified in the RTS-MA ACK message.

At 408, the AP determines resource allocation. For example, the AP may determine which stations to allocate UL resources to based on the transmission class and/or transmission length indicated in the RTS-MA messages. For example, stations indicating a higher priority transmission class (e.g., voice or video) may be allocated resources before stations with lower priority transmissions classes (e.g., Best Effort). If there are not sufficient bandwidth resources for all stations that sent an RTS-MA with the same TC, the AP may determine which stations are allocated resources based on transmission length. Further, for certain embodiments, an AP may also decide resource allocation based on the sounding signals. For example, if one station is positioned such that its transmissions are highly correlated with another station, it may be more efficient overall to not allocate that station resources in a current frame to avoid interference.

At 410, the AP transmits allocation confirmation to the stations. As described above, the confirmation may include an indication that all stations are allocated resources or only a limited subset. The AP may send the allocation confirmation after receiving the sounding. The allocation confirmation may be considered a Clear to Send multiple access (CTS-MA) message indicating which stations are clear to send SDMA UL data. The allocation confirmation may be sent as a multi-cast aggregated MAC protocol data unit (A-MPDU) using a lowest MCS which can be received by all the stations.

In the allocation confirmation message, the AP may confirm spatial stream allocation for use by the stations in the SDMA TxOP. As previously described, some stations may not be allocated UL resources, for example, due to low priority transmission class or high correlation with other clients. The AP may optionally also assign new MCS to each station in the allocation confirmation, for example, based on the sounding signals received. The AP may also define a length of TxOP for the stations to set NAV.

For certain embodiments, rather than send separate allocation acknowledgements and allocation confirmation, a single message may be sent. For example, for embodiments where optional sounding is not performed, the AP may send a single message after receiving RTS-MAs that acknowledges UL resource allocation to the stations.

At 460, the station receives the allocation confirmation and, assuming it was allocated resources, transmits SDMA data, at 462. At 412, the AP receives the SDMA data (from multiple stations). Because much of the allocation and scheduling operations are distributed to the stations using the synchronization rules described above, there is no need to incur the overhead of saving state information or a history of transactions. Thus, once the SDMA transmission is complete, the AP and station may flush the memory used for this SDMA exchange, at 414 and 464, respectively.

Figure 5:
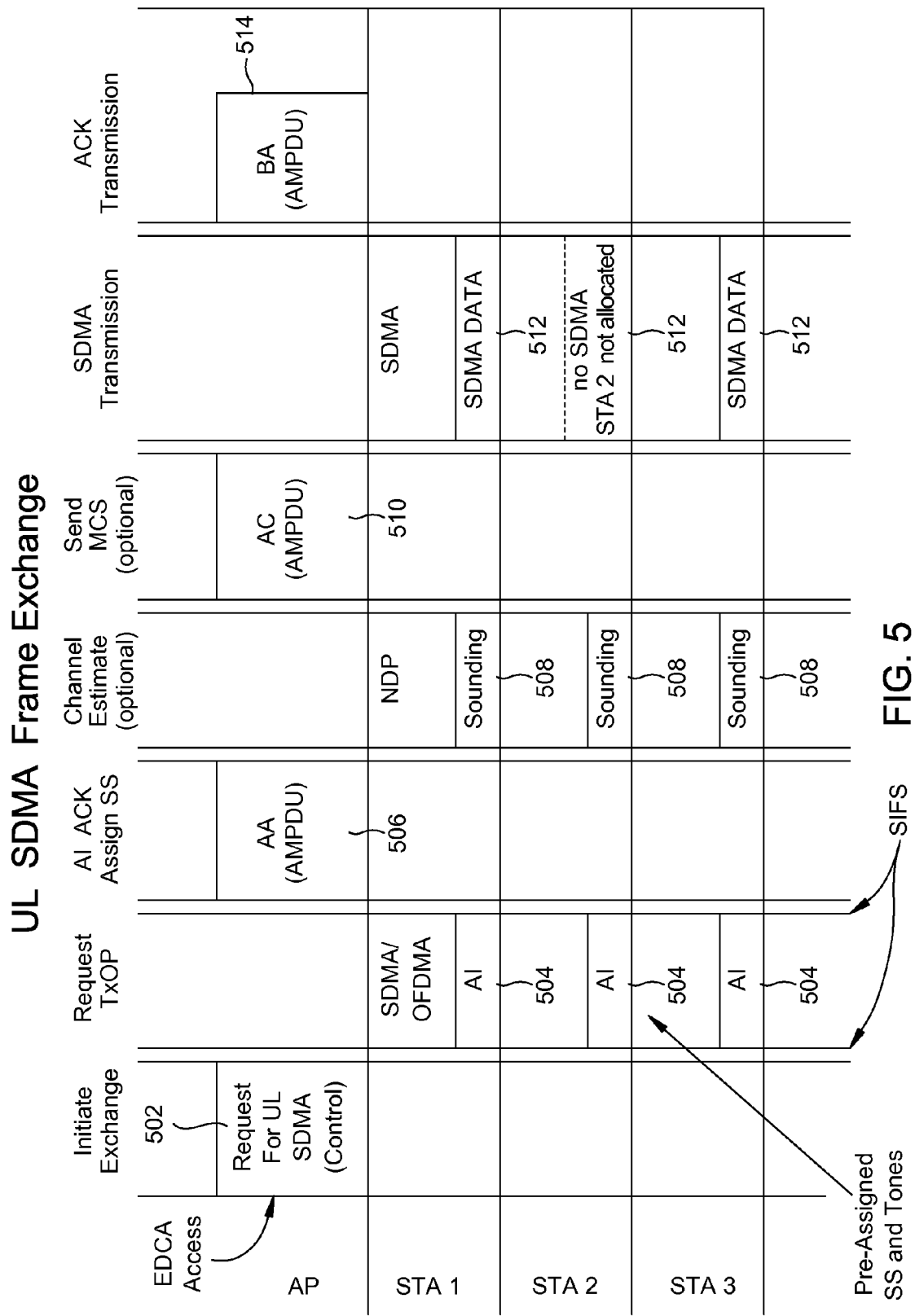
FIG. 5 is an example timing diagram showing example message flow for synchronizing uplink transmissions of multiple access stations in an SDMA system.

FIG. 5 illustrates one example of SDMA UL frame exchange between an AP and three stations (STA1-STA3) in accordance with the operations described above. As illustrated, the AP initiates the exchange by sending a Request for UL SDMA (RSDMA) 502, in some cases after gaining channel access via EDCA techniques. The RSDMA 502 synchronizes the remaining frames in the exchange which are separated by SIFS.

The stations respond to the RSDMA with RTS-MA messages 504 (labeled as allocation indication-AI messages). As described above, the RTS-MA messages 504 may be sent by each station using OFDMA, with a subset of tones and a number of spatial streams assigned to each station for certain embodiments.

In the illustrated example, the AP acknowledges the RTS-MA messages 504 with an acknowledgement message 506 that may request sounding signals from the stations. The stations respond with sounding frames 508. As previously described, the sounding frames 508 may help the AP decide on final resource allocation, which it communicates to the stations in an allocation acknowledgement (or CTS-MA) message 510.

The stations that are allocated UL resources send SDMA UL data 512. In the illustrated example, station 2 is not allocated resources and, thus, is not allowed to send SDMA UL data 512. The AP may acknowledge the SDMA UL data 512 from the stations with a block acknowledgement 514, thereby ending the frame exchange.

Figure 4A:
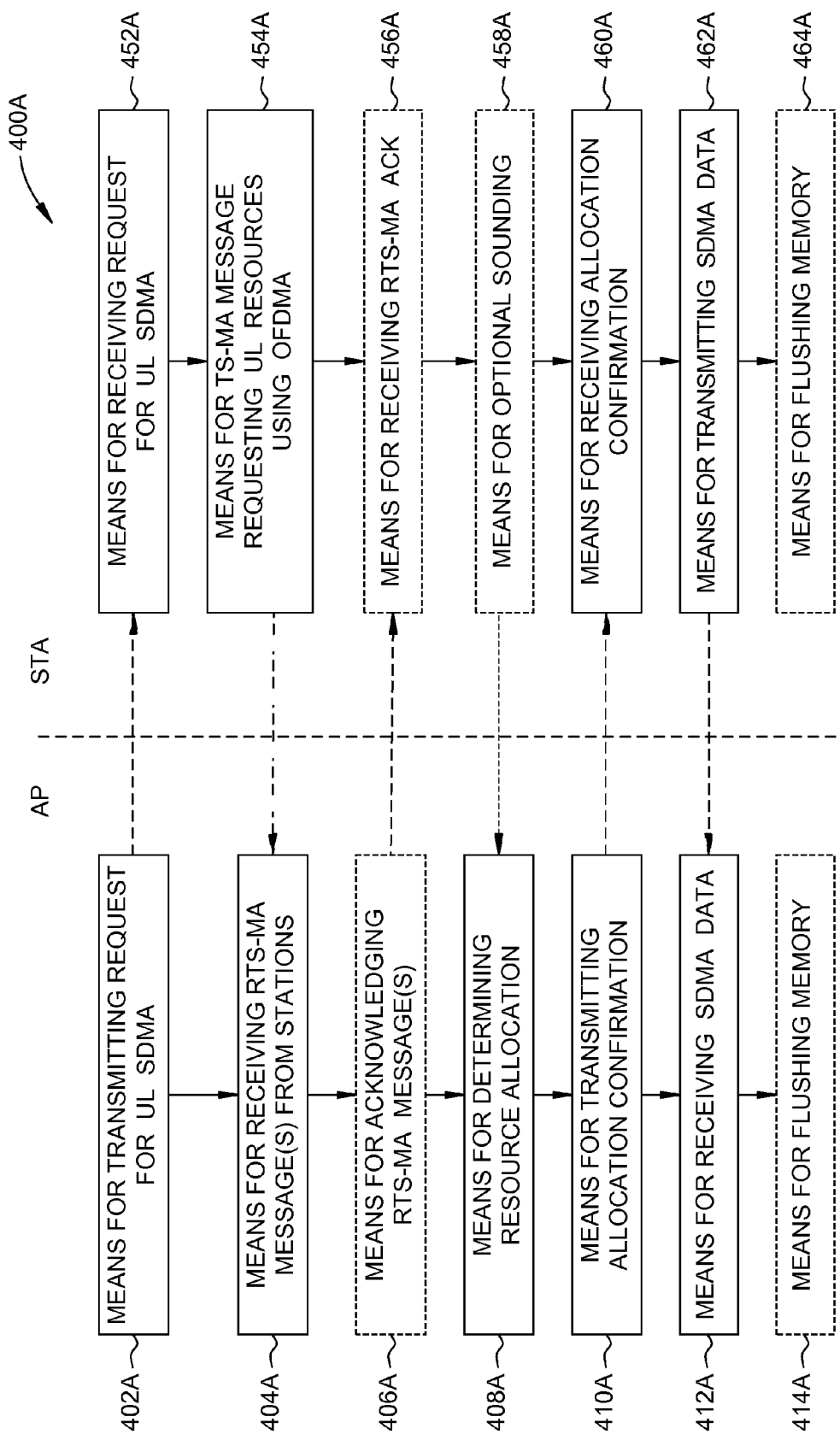
FIG. 4A illustrates example components capable of performing the operations shown in FIG. 4.

The various operations of methods described above may be performed by various hardware and/or software logic, component(s) and/or module(s) corresponding to means-plus-function blocks illustrated in the figures. Generally, where there are methods illustrated in figures any suitable means having corresponding counterpart means-plus-function figures, the operation blocks correspond to means-plus-function blocks with similar numbering. For example, operations 400 shown in FIG. 4 may be performed by corresponding means 400A shown in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for scheduling simultaneous transmissions of data from multiple wireless nodes in a wireless communications system, comprising: initiating a spatial division multiple access (SDMA) exchange by: transmitting, at a base station, a request for information regarding uplink transmissions from the wireless nodes; receiving, in response to the request, information regarding uplink transmissions from the wireless nodes; transmitting an allocation confirmation message allocating uplink resources to a set of at least some of the wireless nodes based on the received information; and receiving simultaneous transmissions of data from the set of wireless nodes according to a SDMA scheme; and flushing the information regarding uplink transmissions from a memory of the base station after transmitting the allocation confirmation message and prior to initiating a next SDMA exchange.

2. The method of claim 1, wherein at least one of the request for information regarding uplink transmissions from the wireless nodes and the allocation confirmation message is transmitted using a message format specified by at least one of the IEEE 802.11 family of standards.

3. The method of claim 1, further comprising:
performing channel access prior to transmitting the request for information regarding uplink transmissions from the wireless nodes.

4. The method of claim 1, wherein receiving, in response to the request, information regarding uplink transmissions from the wireless nodes comprises:
receiving the information simultaneously transmitted from the wireless nodes via an orthogonal division multiple access (OFDMA) scheme.

5. The method of claim 4, wherein each wireless node transmits on a predetermined subset of available tones assigned during an initialization process.

6. The method of claim 1, wherein the allocation confirmation message includes at least one of:
timing adjustment information;
frequency adjustment information; and
power adjustment information.

7. The method of claim 6, wherein the allocation confirmation message includes a number of bits of timing adjustment information for each station.

8. The method of claim 1, further comprising:
determining which wireless nodes will be allocated uplink resources based, at least in part, on the information regarding uplink transmissions from the wireless nodes.

9. The method of claim 1, further comprising:
receiving sounding signals transmitted from the wireless nodes.

10. The method of claim 9, further comprising:
determining which wireless nodes will be allocated uplink resources based, at least in part, on the sounding signals.

11. The method of claim 9, further comprising:
determining data rates for uplink transmission from the wireless nodes based, at least in part, on the sounding signals.

12. The method of claim 1, further comprising transmitting an acknowledgement message acknowledging receipt of the information regarding uplink transmissions from the wireless nodes.

13. A method for scheduling transmissions of data from a wireless node in a wireless communications system that supports simultaneous transmissions of data from multiple wireless nodes, comprising: initiating a spatial division multiple access (SDMA) exchange by: transmitting, at the wireless node, information regarding uplink transmissions via an orthogonal frequency division multiple access (OFDMA) transmission scheme utilizing a subset of available tones in the wireless communications system; receiving a message acknowledging receipt of the transmitted information regarding uplink transmissions; and transmitting data on an uplink after receiving an allocation confirmation message; and flushing the message from a memory of the wireless node after transmitting the data on the uplink and prior to initiating a next SDMA exchange.

14. The method of claim 13, further comprising:
receiving a request for information regarding uplink transmissions from the wireless nodes; and
transmitting the information regarding uplink transmissions in response to the request.

15. The method of claim 14, wherein at least one of the request for information regarding uplink transmissions from the wireless nodes and the allocation confirmation message is transmitted using a message format specified by at least one of the IEEE 802.11 family of standards.

16. The method of claim 13, wherein transmitting data on an uplink after receiving the allocation confirmation message comprises:
transmitting data on the uplink simultaneously with transmissions on the uplink from other wireless nodes according to a spatial division multiple access (SDMA) scheme.

17. The method of claim 16, wherein each wireless node transmits information regarding uplink transmissions according to an OFDMA transmission scheme on a predetermined subset of available tones assigned during an initialization process.

18. The method of claim 13, further comprising receiving, in the message acknowledging receipt of the transmitted information regarding uplink transmissions at least one of:
timing adjustment information;
frequency adjustment information; and
power adjustment information.

19. The method of claim 13, further comprising:
transmitting sounding signals for use in channel estimation after receiving the message acknowledging receipt of the transmitted information regarding uplink transmissions.

20. The method of claim 13, further comprising:
receiving an indication of a data rate to use for transmitting data on the uplink.

21. The method of claim 13, wherein the information regarding uplink transmissions comprises at least one of:
an indication of a transmission class; and
a length of transmission.

22. An apparatus for scheduling simultaneous transmissions of data from multiple wireless nodes in a wireless communications system, comprising: logic for initiating a spatial division multiple access (SDMA) exchange, the logic for initiating the SDMA exchange including: logic for transmitting a request for information regarding uplink transmissions from the wireless nodes; logic for receiving, in response to the request, the information regarding uplink transmissions from the wireless nodes; logic for transmitting an allocation confirmation message allocating uplink resources to a set of at least some of the wireless nodes based on the received information, wherein the information regarding uplink transmissions is flushed from a memory after transmitting the allocation confirmation message and prior to initiating a next SDMA exchange; and logic for receiving simultaneous transmissions of data from the set of wireless nodes.

23. The apparatus of claim 22, wherein the logic for receiving simultaneous transmissions of data from the set of wireless nodes comprises receiving simultaneous transmissions of data sent via a spatial division multiple access (SDMA) scheme.

24. The apparatus of claim 22, wherein at least one of the request for information regarding uplink transmissions from the wireless nodes and the allocation confirmation message is transmitted using a message format specified by at least one of the IEEE 802.11 family of standards.

25. The apparatus of claim 22, further comprising:
logic for performing channel access prior to transmitting the request for information regarding uplink transmissions from the wireless nodes.

26. The apparatus of claim 22, wherein the logic for receiving, in response to the request, information regarding uplink transmissions from the wireless nodes is configured to receive the information simultaneously transmitted from the wireless nodes via an orthogonal division multiple access (OFDMA) scheme.

27. The apparatus of claim 26, wherein each wireless node transmits on a predetermined subset of available tones assigned during an initialization process.

28. The apparatus of claim 22, wherein the allocation confirmation message includes at least one of:
timing adjustment information;
frequency adjustment information; and
power adjustment information.

29. The apparatus of claim 28, wherein the allocation confirmation message includes a number of bits of timing adjustment information for each station.

30. The apparatus of claim 22, further comprising:
logic for determining which wireless nodes will be allocated uplink resources based, at least in part, on the information regarding uplink transmissions from the wireless nodes.

31. The apparatus of claim 22, further comprising:
logic for receiving sounding signals transmitted from the wireless nodes.

32. The apparatus of claim 31, further comprising:
logic for determining which wireless nodes will be allocated uplink resources based, at least in part, on the sounding signals.

33. The apparatus of claim 31, further comprising:
logic for determining data rates for uplink transmission from the wireless nodes based, at least in part, on the sounding signals.

34. The apparatus of claim 22, further comprising logic for transmitting an acknowledgement message acknowledging receipt of the information regarding uplink transmissions from the wireless nodes.

35. An apparatus for scheduling transmissions of data from a wireless node in a wireless communications system that supports simultaneous transmissions of data from multiple wireless nodes, comprising: logic for initiating a spatial division multiple access (SDMA) exchange, the logic for initiating the SDMA exchange including: logic for transmitting information regarding uplink transmissions via an orthogonal frequency division multiple access (OFDMA) transmission scheme utilizing a subset of available tones in the wireless communications system; logic for receiving a message acknowledging receipt of the transmitted information regarding uplink transmissions; and logic for transmitting data on an uplink after receiving an allocation confirmation message, wherein the message is flushed from a memory of the wireless node after transmitting the data on the uplink and prior to initiating a next SDMA exchange.

36. The apparatus of claim 35, further comprising:
logic for receiving a request for information regarding uplink transmissions from the wireless nodes; and
logic for transmitting the information regarding uplink transmissions in response to the request.

37. The apparatus of claim 36, wherein at least one of the request for information regarding uplink transmissions from the wireless nodes and the allocation confirmation message is transmitted using a message format specified by at least one of the IEEE 802.11 family of standards.

38. The apparatus of claim 35, wherein the logic for transmitting data on an uplink after receiving the allocation confirmation message is configured to transmit data on the uplink simultaneously with transmissions on the uplink from other wireless nodes according to a spatial division multiple access (SDMA) scheme.

39. The apparatus of claim 38, wherein each wireless node transmits information regarding uplink transmissions according to an OFDMA transmission scheme on a predetermined subset of available tones assigned during an initialization process.

40. The apparatus of claim 35, further comprising logic for receiving, in the message acknowledging receipt of the transmitted information regarding uplink transmissions at least one of:
timing adjustment information;
frequency adjustment information; and
power adjustment information.

41. The apparatus of claim 35, further comprising:
logic for transmitting sounding signals for use in channel estimation after receiving the message acknowledging receipt of the transmitted information regarding uplink transmissions.

42. The apparatus of claim 35, further comprising:
logic for receiving an indication of a data rate to use for transmitting data on the uplink.

43. The apparatus of claim 35, wherein the information regarding uplink transmissions comprises at least one of:
an indication of a transmission class; and
a length of transmission.

44. An apparatus for scheduling simultaneous transmissions of data from multiple wireless nodes in a wireless communications system, comprising: means for initiating a spatial division multiple access (SDMA) exchange including: means for transmitting a request for information regarding uplink transmissions from the wireless nodes; means for receiving, in response to the request, the information regarding uplink transmissions from the wireless nodes; means for transmitting an allocation confirmation message allocating uplink resources to a set of at least some of the wireless nodes based on the received information; and means for receiving simultaneous transmissions of data from the set of wireless nodes; and means for flushing the information regarding uplink transmissions from a memory after transmitting the allocation confirmation message and prior to initiating a next SDMA exchange.

45. The apparatus of claim 44, wherein the means for receiving simultaneous transmissions of data from the set of wireless nodes comprises receiving simultaneous transmissions of data sent via a spatial division multiple access (SDMA) scheme.

46. The apparatus of claim 44, wherein at least one of the request for information regarding uplink transmissions from the wireless nodes and the allocation confirmation message is transmitted using a message format specified by at least one of the IEEE 802.11 family of standards.

47. The apparatus of claim 44, further comprising:
means for performing channel access prior to transmitting the request for information regarding uplink transmissions from the wireless nodes.

48. The apparatus of claim 44, wherein the means for receiving, in response to the request, information regarding uplink transmissions from the wireless nodes is configured to receive the information simultaneously transmitted from the wireless nodes via an orthogonal division multiple access (OFDMA) scheme.

49. The apparatus of claim 48, wherein each wireless node transmits on a predetermined subset of available tones assigned during an initialization process.

50. The apparatus of claim 44, wherein the allocation confirmation message includes at least one of:
timing adjustment information;
frequency adjustment information; and
power adjustment information.

51. The apparatus of claim 50, wherein the allocation confirmation message includes a number of bits of timing adjustment information for each station.

52. The apparatus of claim 44, further comprising:
means for determining which wireless nodes will be allocated uplink resources based, at least in part, on the information regarding uplink transmissions from the wireless nodes.

53. The apparatus of claim 44, further comprising:
means for receiving sounding signals transmitted from the wireless nodes.

54. The apparatus of claim 53, further comprising:
means for determining which wireless nodes will be allocated uplink resources based, at least in part, on the sounding signals.

55. The apparatus of claim 53, further comprising:
means for determining data rates for uplink transmission from the wireless nodes based, at least in part, on the sounding signals.

56. The apparatus of claim 44, further comprising means for transmitting an acknowledgement message acknowledging receipt of the information regarding uplink transmissions from the wireless nodes.

57. An apparatus for scheduling transmissions of data from a wireless node in a wireless communications system that supports simultaneous transmissions of data from multiple wireless nodes, comprising: means for initiating a spatial division multiple access (SDMA) exchange including: means for transmitting information regarding uplink transmissions via an orthogonal frequency division multiple access (OFDMA) transmission scheme utilizing a subset of available tones in the wireless communications system; means for receiving a message acknowledging receipt of the transmitted information regarding uplink transmissions; and means for transmitting data on an uplink after receiving an allocation confirmation message; and means for flushing the message from a memory of the wireless node after transmitting the data on the uplink and prior to initiating a next SDMA exchange.

58. The apparatus of claim 57, further comprising:
means for receiving a request for information regarding uplink transmissions from the wireless nodes; and
means for transmitting the information regarding uplink transmissions in response to the request.

59. The apparatus of claim 58, wherein at least one of the request for information regarding uplink transmissions from the wireless nodes and the allocation confirmation message is transmitted using a message format specified by at least one of the IEEE 802.11 family of standards.

60. The apparatus of claim 57, wherein the means for transmitting data on an uplink after receiving the allocation confirmation message is configured to transmit data on the uplink simultaneously with transmissions on the uplink from other wireless nodes according to a spatial division multiple access (SDMA) scheme.

61. The apparatus of claim 60, wherein each wireless node transmits information regarding uplink transmissions according to an OFDMA transmission scheme on a predetermined subset of available tones assigned during an initialization process.

62. The apparatus of claim 57, further comprising means for receiving, in the message acknowledging receipt of the transmitted information regarding uplink transmissions at least one of:
timing adjustment information;
frequency adjustment information; and
power adjustment information.

63. The apparatus of claim 57, further comprising:
means for transmitting sounding signals for use in channel estimation after receiving the message acknowledging receipt of the transmitted information regarding uplink transmissions.

64. The apparatus of claim 57, further comprising:
means for receiving an indication of a data rate to use for transmitting data on the uplink.

65. The apparatus of claim 57, wherein the information regarding uplink transmissions comprises at least one of:
an indication of a transmission class; and
a length of transmission.

66. A computer-program product for scheduling simultaneous transmissions of data from multiple wireless nodes in a wireless communications system comprising a non-transitory computer readable medium having instructions stored thereon, the instructions being executable by one or more processors and the instructions comprising instructions for initiating a spatial division multiple access (SDMA) exchange, the instructions for initiating the SDMA exchange including instructions for: transmitting a request for information regarding uplink transmissions from the wireless nodes; receiving, in response to the request, the information regarding uplink transmissions from the wireless nodes; transmitting an allocation confirmation message allocating uplink resources to a set of at least some of the wireless nodes based on the received information, wherein the information regarding uplink transmissions is flushed from a memory after transmitting the allocation confirmation message and prior to initiating a next SDMA exchange; and receiving simultaneous transmissions of data from the set of wireless nodes.

67. A computer-program product for scheduling transmissions of data from a wireless node in a wireless communications system that supports simultaneous transmissions of data from multiple wireless nodes comprising a non-transitory computer readable medium having instructions stored thereon, the instructions being executable by one or more processors and the instructions comprising instructions for initiating a spatial division multiple access (SDMA) exchange, the instructions for initiating the SDMA exchange including instructions for: transmitting information regarding uplink transmissions via an orthogonal frequency division multiple access (OFDMA) transmission scheme utilizing a subset of available tones in the wireless communications system; receiving a message acknowledging receipt of the transmitted information regarding uplink transmissions; and transmitting data on an uplink after receiving an allocation confirmation message, wherein the message is flushed from a memory after transmitting the data on the uplink and prior to initiating a next SDMA exchange.

* * * * *